(12) United States Patent
Shigeta

(10) Patent No.: US 12,165,467 B2
(45) Date of Patent: *Dec. 10, 2024

(54) DOUBLE CHIP TRAY, CHIP TRAY, AND GAME MANAGEMENT SYSTEM

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/218,835

(22) Filed: Jul. 6, 2023

(65) Prior Publication Data

US 2023/0360470 A1    Nov. 9, 2023

Related U.S. Application Data

(63) Continuation of application No. 17/238,815, filed on Apr. 23, 2021, now Pat. No. 11,756,370.

(30) Foreign Application Priority Data

Apr. 27, 2020 (JP) .................................. 2020-078604

(51) Int. Cl.
*G07F 17/32* (2006.01)
*G06K 19/04* (2006.01)

(52) U.S. Cl.
CPC ......... *G07F 17/322* (2013.01); *G06K 19/047* (2013.01); *G07F 17/3223* (2013.01);
(Continued)

(58) Field of Classification Search
CPC . G07F 17/322; G07F 17/3248; G07F 17/3251
See application file for complete search history.

(56) References Cited

U.S. PATENT DOCUMENTS 11,756,370 B2 *   9/2023   Shigeta ................ G06K 19/047
                                                         463/11
2002/0042299 A1 *  4/2002   Soltys ................ G06Q 10/0639
                                                         463/29

(Continued)

FOREIGN PATENT DOCUMENTS

JP          2010122852 A      6/2010
JP          2014504164 A      2/2014
(Continued)

OTHER PUBLICATIONS

International Search Report dated Jun. 1, 2021 issued in PCT Application PCT/JP2021/016682.
(Continued)

*Primary Examiner* — Jasson H Yoo
(74) *Attorney, Agent, or Firm* — NORTON ROSE FULBRIGHT US LLP

(57) ABSTRACT

There is provided a game management system that can manage games using RFID tags built into chips even when multiple types of chips are housed in a chip tray, and a double chip tray used for the system. A chip tray is a double chip tray equipped with a chip tray reader capable of reading two types of chips of different shapes and/or sizes that incorporate RFID tags, namely round chips and plaque chips, an upper chip holder that can hold chips, and a lower chip holder that can hold chips. The chip tray reader is configured to read the RFID tags of the two types of chips held in the chip tray, and is capable of determining the respective amounts.

15 Claims, 11 Drawing Sheets

(52) U.S. Cl.
CPC ...... *G07F 17/3248* (2013.01); *G07F 17/3251* (2013.01); *G07F 17/3293* (2013.01)

(56) References Cited

U.S. PATENT DOCUMENTS

| | | | |
|---|---|---|---|
| 2007/0184898 A1* | 8/2007 | Miller | G07F 17/32 463/29 |
| 2012/0241344 A1* | 9/2012 | Gronau | G07F 7/0893 206/445 |
| 2014/0339107 A1* | 11/2014 | Gelinotte | G07F 17/3248 206/216 |
| 2018/0075690 A1* | 3/2018 | Moore | G06Q 20/3278 |
| 2019/0005767 A1 | 1/2019 | Shigeta | |
| 2019/0347893 A1 | 11/2019 | Shigeta | |
| 2019/0392273 A1 | 12/2019 | Shigeta | |
| 2021/0335082 A1 | 10/2021 | Shigeta | |

FOREIGN PATENT DOCUMENTS

| | | |
|---|---|---|
| JP | 2017136347 A | 8/2017 |
| JP | 2018130183 A | 8/2018 |
| JP | 2019005565 A | 1/2019 |
| JP | 2019198651 A | 11/2019 |
| WO | 2020076935 A1 | 4/2020 |
| WO | 2021221023 A1 | 11/2021 |

OTHER PUBLICATIONS

Japanese Office Action dated Mar. 29, 2022 issued in JP Application 2021-073625.
Australian Office Action dated Apr. 13, 2022 issued in AU Application 2021202512.

* cited by examiner

DOUBLE CHIP TRAY, CHIP TRAY, AND GAME MANAGEMENT SYSTEM

CROSS-REFERENCE TO RELATED APPLICATIONS

This application is a continuation of U.S. patent application Ser. No. 17/238,815 filed Apr. 23, 2021, which claims the benefit of JP Pat. App. No. 2020-78604 filed Apr. 27, 2020, the disclosure of each application is hereby incorporated by reference.

TECHNICAL FIELD

The present disclosure relates to a double chip tray for accommodating gaming chips, a chip tray, and a game management system.

BACKGROUND ART

In casinos, games are played using gaming chips (hereinafter simply referred to as "chips"). A player participates in a game by betting her/his chips. The player who wins the game receives redemption of chips from the dealer based on the game result and the amount of the bet, while the player who loses the game has the chips she/he bet collected by the dealer.

The game table where the game is played is provided with a chip tray to store chips owned by the dealer, i.e., chips collected from the losing player for redemption to the winning player.

In addition to cash chips, which can be exchange for cash by players, casinos use Non-Negotiation (NN) chips, which can only be used for betting (but if a player wins the game, the player can be reimbursed in cash chips). NN chips are not redeemable for cash, but the player is rewarded for their purchase. NN chips are also called "promotional chips" because of this attribute.

There are two types of chips: disc-shaped chips and rectangular plate-shaped chips. Rectangular plate-shaped chips are sometimes referred to as plaque chips (hereafter, rectangular plate-shaped chips are referred to as "plaque chips"). In general, disc-shaped chips (also referred to as "round chips" below) are relatively low-value (e.g., less than $5,000), while rectangular plate-shaped chips are high-value (e.g., more than $10,000).

In the game, round chips and plaque chips are used in a mixed manner. It is also necessary for the chip tray to be able to accommodate both round chips and plaque chips, which are different in shape from each other.

In addition, the chip contains an RFID tag that stores the denomination, attribute, identification information, etc. An RFID reader reads the information on the RFID tag in the chip to perform various game management (see, for example, JPA2019-5565).

SUMMARY

The purpose of the present disclosure is to provide a game management system that can manage games using RFID tags embedded in multiple types of chips, even when multiple types of chips with different shapes or sizes are housed in a chip tray, and a double chip tray or chip tray for use with the system.

A double chip tray in one aspect of the present disclosure is a double chip tray comprising: an RFID chip reader capable of reading two types of chips of different shapes and/or sizes that incorporate RFID tags; an upper chip holder that can hold the chips; and a lower chip holder that can hold the chips, wherein the two types of chips are disc-shaped chips and rectangular plate-shaped chips, and each of the two types of chips incorporates at least one or two RFID tags associated with a denomination of the chip, the upper chip holder holds at least the disc-shaped chip, the lower chip holder holds at least the rectangular plate-shaped chip, and the RFID chip reader is configured to read the RFID tags of the two types of chips, the disc-shaped chip and the rectangular plate-shaped chip, held in the double chip tray, and to determine a respective amount.

With this configuration, even when a round chip and a plaque chip are held in a double chip tray, the RFID tags embedded in either chip can be read to determine the amount of the chips.

In the above double chip tray, the disk-shaped chips may be placed vertically, and the rectangular plate-shaped chips may be placed vertically or flat. That is, in the above double chip tray, the disk-shaped chip may be allowed to be held in a vertical position along a tube provided in the double chip tray, the rectangular plate-shaped chip may be allowed to be held in the double chip tray in a vertical or flat position, and the RFID chip reader may be capable of reading the RFID tags of the disc-shaped chip in the vertical position and the rectangular plate-shaped chip in the vertical or flat position.

This configuration makes it possible to read the RFID tags of the vertically placed round chip and the vertically or flatly placed plaque chip even when they are mixed in the double chip tray.

In the double chip tray described above, the RFID chip reader may read the RFID tags of the vertically and horizontally placed chips, respectively. That is, in the above double chip tray, the RFID chip reader may be capable of reading the RFID tags embedded in the disk-shaped chips or rectangular plate-shaped chips, whether the disk-shaped chips or rectangular plate-shaped chips are placed vertically or flatly in the double chip tray.

With this structure, the RFID tags of the chips held in any of the vertical and horizontal orientations can be read.

In the double chip tray described above, the RFID chip reader may read the RFID tags of the chips placed vertically on the upper chip holder. That is, in the above double chip tray, the upper chip holder may be capable of holding the disk-shaped chips or the rectangular plate-shaped chips in a vertical position along the tube, and the RFID chip reader may be capable of reading the RFID tags of the disk-shaped chips or the rectangular plate-shaped chips placed vertically in the upper chip holder.

This configuration enables the RFID chip reader to read the RFID tags of chips placed vertically in the upper section.

In the double chip tray described above, the RFID chip reader may read the RFID tags of the chips placed vertically and flat, respectively, in the lower chip holder. That is, in the above double chip tray, the lower chip holder may be capable of holding the disc-shaped chips or rectangular plate-shaped chips in vertical and flat positions, and the RFID chip reader may be capable of reading the RFID tags of the disk-shaped chips or the rectangular plate-shaped chips placed vertically and flatly in the lower chip holder.

With this configuration, the RFID tags of any of the chips placed vertically and flat in the lower chip holder can be read.

In the above double chip tray, the RFID chip reader may read the RFID tags of the chips placed vertically and flat, respectively, in the upper chip holder. That is, in the above double chip tray, the RFID chip reader may also be capable of reading the RFID tags of the disk-shaped chips or the rectangular plate-shaped chips held flatly in the upper chip holder.

With this configuration, the RFID tags of any of the chips placed vertically and flatly in the upper chip holder can be read.

In the above double chip tray, there may be antennas in the upper chip holder and the lower chip holder, respectively. That is, the RFID chip reader may be provided with a plurality of RFID antennas, the plurality of RFID antennas being located in each of the upper chip holder and the lower chip holder.

This allows the RFID tags embedded in the upper chip holder and the lower chip holder, respectively, to be read by different RFID antennas.

In the above double chip tray, multiple RFID tags may be recognized as those of a single chip. That is, in the above double chip tray, when each of the disc-shaped chips or the rectangular plate-shaped chips is provided with a plurality of RFID tags, the RFID chip reader may be capable of recognizing the plurality of RFID tags as being incorporated in the same disc-shaped chip or the same rectangular plate-shaped chip.

With this configuration, a single chip is not recognized in duplicate, and the number and amount of chips can be accurately determined.

The double chip tray described above may be capable of determining the total amount of each of the disc-shaped chips and rectangular plate-shaped chips. That is, in the above double chip tray, the total amount of each of the disc-shaped chips and rectangular plate-shaped chips contained in the double chip tray may be determined based on the reading of the RFID tag.

With this configuration, it is possible to determine the respective amounts of cash chips and NN chips held in the double chip tray.

In the double chip tray described above, the upper chip holder and the lower chip holder may be movable by a connecting mechanism. That is, the above double chip tray may further comprise a connecting mechanism that connects the upper chip holder to the lower chip holder and moves the upper chip holder between a first position that covers the lower chip holder from above and a second position that is displaced from the lower chip holder to open the upper surface of the lower chip holder.

With this configuration, the connecting mechanism can open the upper surface of the lower chip holder and move the chips between the upper chip holder and the lower chip holder.

In the double chip tray described above, it may be determined whether the entire chips in the double chip tray are the same before and after the upper tray is moved. That is, the above double chip tray may further comprise a determination device configured to determine whether or not there is a variation in the sum of the information of the RFID tags stored in the double chip tray before and after a movement of the upper chip holder by the connecting mechanism.

The above double chip tray may further comprise a display device that displays a result of a determination of the determination device.

With this configuration, it is possible to visually confirm whether or not the chips have been correctly moved between the upper chip holder and the lower chip holder.

One aspect of the present disclosure is a game management system, wherein the game management system comprises: a double chip tray described above; a winning/losing result determination device configured to determine a winning/losing result of each game on a game table; a table chip determination device capable of identifying locations, attributes, and amount of chips placed on the game table; and a management control device capable of identifying the attributes and amounts of the chips in the double chip tray and the chips on the game table based on the results of the reading of an RFID chip reader of the double chip tray and the results of a determination of the table chip determination device, wherein the management control device is capable of determining that the chips being wagered in the game and to be collected have been collected to the double chip tray, based on the winning/losing result determined by the winning/losing result determination device, a reading result of the RFID chip reader, and a determination result of the table chip determination device, when collections of losing chips wagered by each player in each game has been completed.

This structure enables the determination of whether or not the chips bet by the losing player have been correctly collected.

In the game management system described above, it may be checked whether the cash chips have been correctly collected. That is, in the game management system described above, the management control device may be capable of determining that a payout to winning chips has been performed using the chips contained in the double chip tray, based on the winning/losing result determined by the winning/losing result determination device, a reading result of the RFID chip reader, and a determination result of the table chip determination device, when payouts to the winning chips wagered by each player in each game has been completed.

This structure allows the system to determine whether or not the chips bet by the losing player have been correctly collected.

In the above game management system, it may be checked whether the chips have been paid correctly. That is, in the game management system described above, the management control device may be capable of determining that a payout to winning chips has been performed using the chips contained in the double chip tray, based on the winning/losing result determined by the winning/losing result determination device, a reading result of the RFID chip reader, and a determination result of the table chip determination device, when payouts to the winning chips wagered by each player in each game has been completed.

With this structure, it is possible to determine whether or not the redemption to the chips that were bet by the winning player has been correctly made.

In the above game management system, it may be checked whether the total amount of the chip tray after the collection and payment is correct. That is, in the game management system described above, the management control device may calculate a calculated total amount of the chips that should be in the double chip tray, compare the calculated total amount with an actual total amount of chips in the double chip tray after the settlement, and determine whether there is a difference between the calculated total amount and the actual total amount, wherein the management control device may calculate the calculated total amount of the chips by adding an amount of the chips to be collected to and subtracting an amount of the chips to be paid-out from a total amount of chips in the double chip tray before the settlement of each game, wherein the amount of the chips to be collected and the amount of the chips to be paid-out may be calculated based on the winning/losing result determined by the winning/losing result determination device and a determination result of the table chip determination device.

With this configuration, it is possible to verify whether the settlement has been performed correctly.

The chip tray of one aspect of the present disclosure can houses two types of chips of different shapes and/or sizes, and can read the RFID tags of both vertically and flat chips. That is, a chip tray of the present disclosure is a chip tray equipped with an RFID chip reader capable of reading two types of chips of different shapes and/or sizes that incorporate RFID tags, wherein the two types of chips are disc-shaped chips and rectangular plate-shaped chips, and each of the two types of chips incorporates at least one or two RFID tags associated with a denomination of the chip, the RFID chip reader is configured to read the RFID tags of the two types of chips, the disc-shaped chip and the rectangular plate-shaped chip, held in the double chip tray, and to determine a respective amount, the disk-shaped chip can be held in a vertical position along a tube provided in the chip tray, the rectangular plate-shaped chip can be held in the chip tray in a vertical or flat position, and the RFID chip reader is capable of reading the RFID tags of the disc-shaped chip in the vertical position and the rectangular plate-shaped chip in the vertical or flat position.

With this structure, even when a chip tray contains a round chip and a plaque chip, the RFID tags embedded in either chip can be read to determine the amount of the chips.

DESCRIPTION OF EMBODIMENTS

The following are detailed descriptions of a chip tray and a game management system in accordance with the present disclosure with reference to the drawings. The components in the following embodiments include those that can be readily assumed by those skilled in the art or those that are substantially the same.

Figure 1:
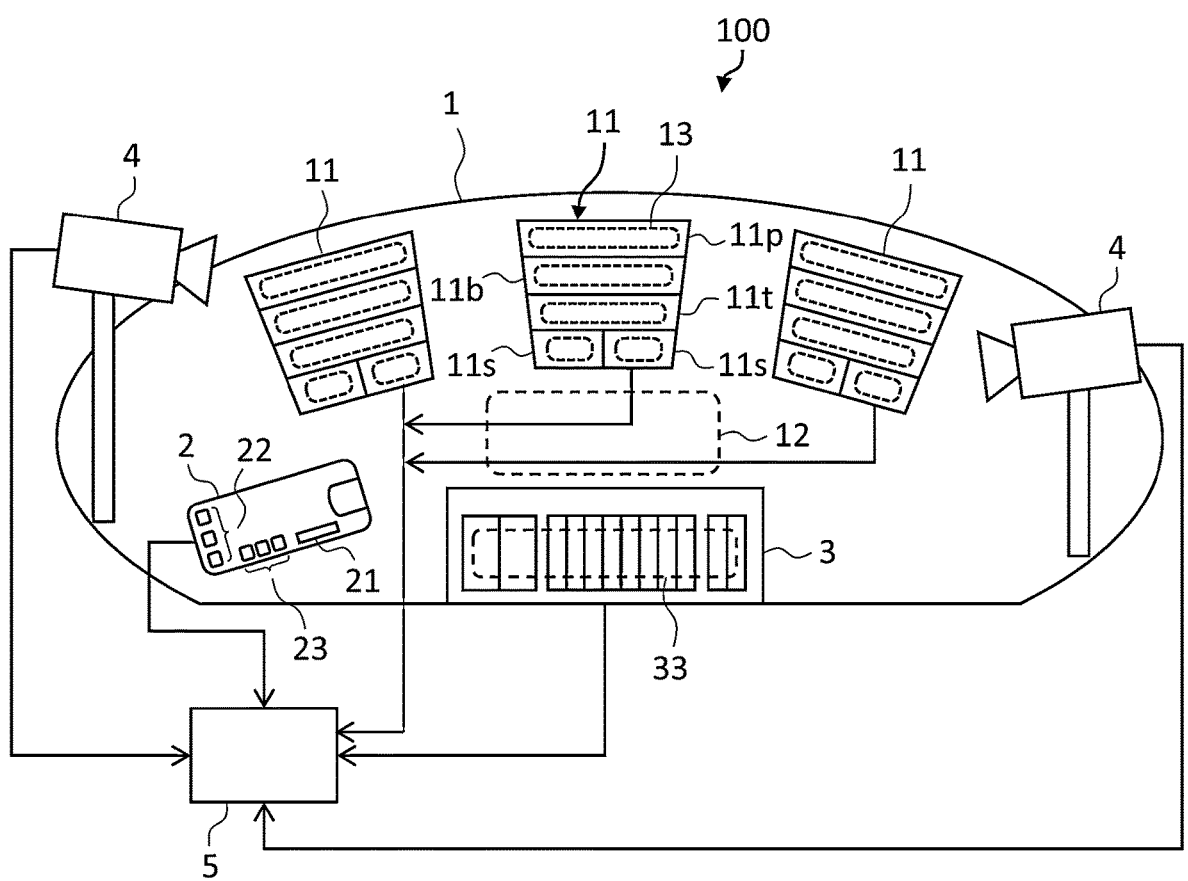
FIG. 1 shows a configuration of a game management system including the chip tray of an embodiment of the present disclosure.

FIG. 1 shows a configuration of a game management system including the chip tray of an embodiment of the present disclosure. The game management system 100 of this embodiment includes a game table 1 including a betting area, a card shoe 2 placed on the game table 1, a chip tray 3 incorporated into the game table 1, a camera 4 that photographs at least the betting area, a management control device 5a that is connected to card shoe 2, a chip tray 3, and a camera 4.

The game table 1 of this system is a table for playing card games. In this card game, a dealer deals the cards. The game table 1 of this embodiment is a table for playing baccarat games. The game table 1 has a betting area 11 for placing gaming chips to be bet by the players, a playing card placement area 12 where the dealer draws playing cards (hereinafter simply referred to as "cards") from the card shoe 2. The betting area 11 is provided at each of a plurality of player positions on the game table 1.

Figure 2:
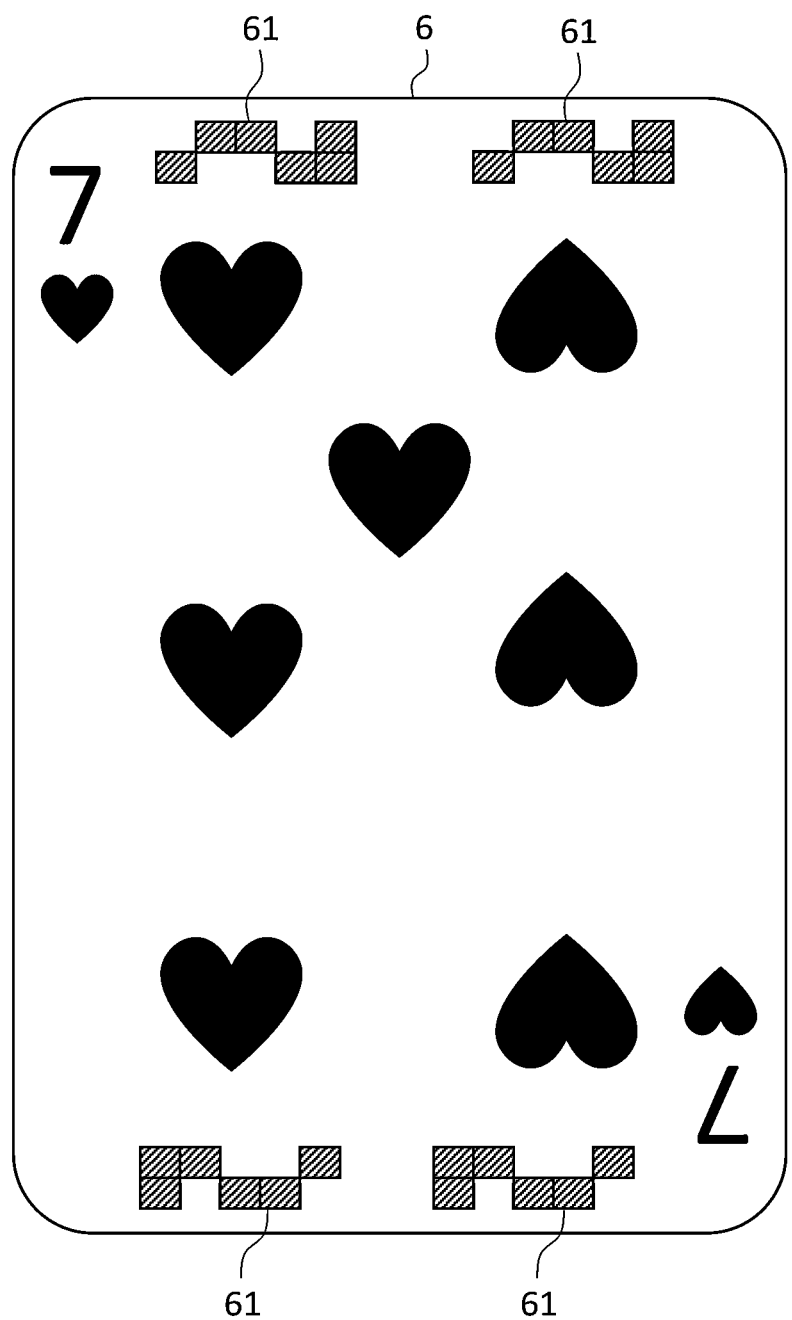
FIG. 2 shows an example of a playing card of an embodiment of the present disclosure.

FIG. 2 shows an example of a playing card of an embodiment of the present disclosure. The card 6 is a rectangle consisting of a long side and a short side, the front side is decorated with a pattern, and the back side shows the rank and suit. A code 61, which can be visualized by a black light, is attached to the short edge of the back side. The code 61 represents the rank and suit of the card.

There are two types of chips used in this system: round chips and plaque chips.

Figure 3:
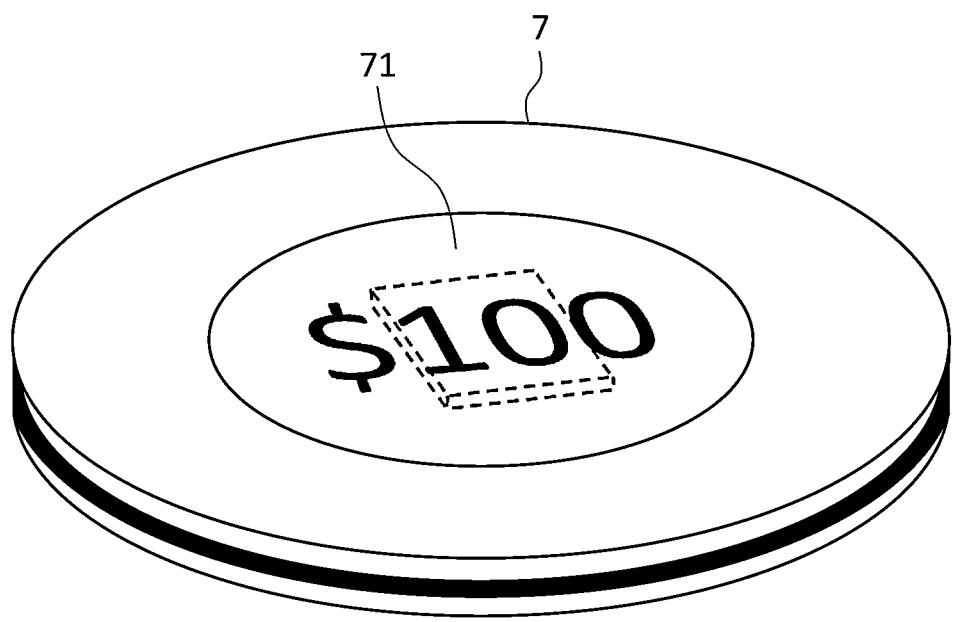
FIG. 3 shows an example of a round chip of an embodiment of the present disclosure.

FIG. 3 shows an example of a round chip of an embodiment of the present disclosure. The round chip 7 has a disc shape and both planes are marked with numbers indicating its denomination. In this embodiment, the round chip 7 has the same size regardless of its denomination. The round chip 7 incorporates an RFID tag 71, which stores the attributes of the chip (cash chip or NN chip), the denomination of the chip, and the identification information of the chip. The RFID tag 71 may further store the owner's history information (player ID, dealer ID, cage ID, etc.) in a rewritable manner. A plurality of RFID tags 71 may be built into a single round chip 7.

The side surface of the round chip 7 has a colored band in the center of the thickness direction, and a striped pattern consisting of white-colored-white is formed in the thickness direction. The color of the band on the side corresponds to the denomination of the round chip 7. In particular, even when the round chips are stacked and the denomination written on the flat surface cannot be seen, the color of the band on the side of the stacked round chips can be used to determine the denomination of each round chip. Information other than the amount may be represented by a pattern on the side of the round chip 7. A code indicating the denomination or other information may be written on the side of the round chip 7.

Figure 4:
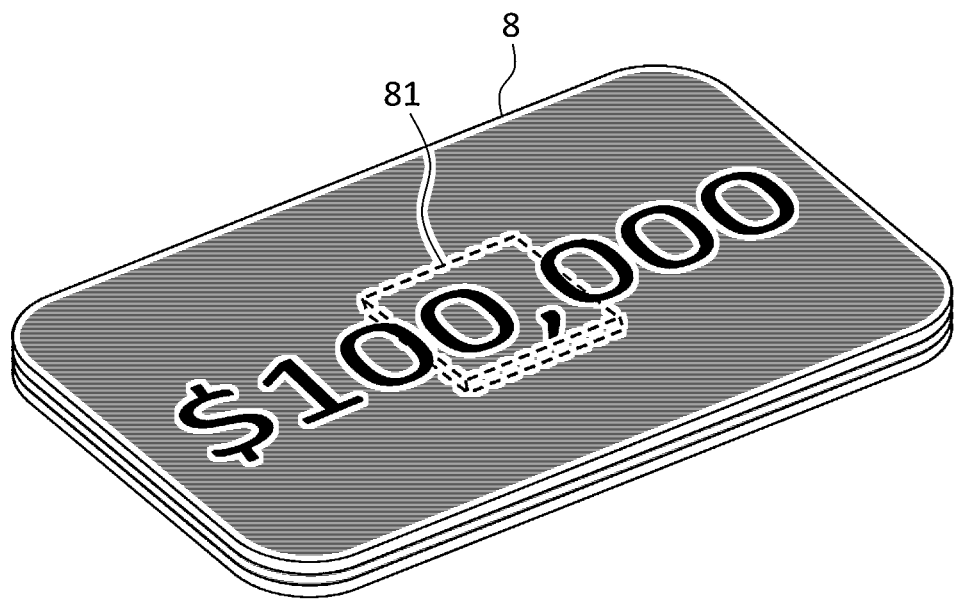
FIG. 4 shows an example of a plaque chip of an embodiment of the present disclosure.

FIG. 4 shows an example of a plaque chip of an embodiment of the present disclosure. The plaque chip 8 has a rectangular plate shape or other shape larger than the round chip 7. In the example of FIG. 4, the plaque chip 8 is a rectangular plate shape. The plaque chip 8 also contains an RFID tag 81, which stores the attributes of the plaque chip (cash chip or NN chip), the denomination of the plaque chip, and the identification information of the plaque chip. The RFID tag 81 may also store the owner's history information in a rewritable manner. Multiple RFID tags 81 may be embedded in one plaque chip 8.

Similar to the round chip 7, the side of the plaque chip 8 is also marked with a band of different colors depending on the denomination of the plaque chip 8, forming a white-colored-white striped pattern in the thickness direction, and the denomination of the plaque chip 8 can be known based on the pattern on the side.

Returning to FIG. 1, a table chip reader 13 is installed inside the betting area 11 of the game table 1 to read the RFID tags 71 and 81 embedded in the round chips 7 and plaque chips 8, respectively, as a table chip determination device. This table chip reader 13 is equipped with an antenna for each betting area 11. This allows the table chip reader 13 to read the RFID tags 71 and 81 for each betting area 11.

The table chip reader 13 can read the RFID tags 71 and 81 of multiple chips placed in the corresponding betting area 11 at once. As described above, the denomination of the chips concerned is stored in the RFID tags 71 and 81. Therefore, by reading the RFID tags 71 and 81 with the table chip reader 11, the total amount of chips bet in each betting area 11, i.e., the bet amount in each betting area 11, can be known. The table chip reader 13 transmits the information read from the RFID tags 71 and 81 of the chips placed in each betting area 11 to the management control device 5.

The card shoe 2 contains a plurality of decks of shuffled cards 6. The dealer can pull out the cards 6 one by one from the card shoe 2. The card shoe 2 is equipped with a code reader 21 that reads a code 61 written on the back of the card 6 at least when the card 6 is pulled out by the dealer.

In baccarat, the outcome of the game (i.e., the result of winning or losing, which indicates which betting area the player bet on won) is determined solely by the rank of the plurality of cards that the dealer pulls out in order from the card shoe 2. Therefore, the card shoe 2 can determine the outcome of the game by reading the code of the card to be drawn out. The game results (winning ways) can be player, banker, or tie, and in addition to these, there are player pairs, banker pairs, and other special winning ways set up by the casino. Each winning way has a redemption rate based on its probability of occurrence.

The game table 1 has 11 betting areas for each player position, corresponding to the above game results (winning ways). In other words, the game table 1 has betting areas 11p, 11b, and 11t for each player position, and the betting area 11 corresponding to the special way of winning is set as the side betting area 11s.

In each game, the card shoe 2 stores at least the read rank of the drawn cards and their order to determine the game result. The card shoe 2 is equipped with a monitor 21, a group of lamps 22 consisting of a plurality of lamps of different colors, and a group of operation buttons 23 consisting of a plurality of buttons. The card shoe 2 displays the game result on the monitor 21 when the dealer operates the button group 23. The card shoe 2 has different colored lamps that light up according to the end or start of the game. The card shoe 2 transmits the information on the rank (and suit) of the read card 6 to the management control device 5.

The chip tray 3 is a double chip tray with an upper chip holder 31 and a lower chip holder 32. The upper chip holder 31 has a round chip holder 31a that holds round chips 7 and a plaque chip holder 31b that holds plaque chips 8. The lower chip holder 32 has a round chip holder 32a that holds round chips 7 and a plaque chip holder 32b that holds plaque chips 8. The upper chip holder 31 is further provided with a collected chip holder 31c for temporarily holding round chips 7 collected from the betting area 11.

The chip tray 3 is equipped with a tray chip reader 33 for reading the RFID tags 71 of the round chips 7 and the RFID tags 81 of the plaque chips 8 held in the upper chip holder 31 and the lower chip holder 32. The tray chip reader 33 transmits the information read from the RFID tags 71 and 81 to the management control device 5.

The camera 4 is installed on a pole fixed to the game table 1 so as to photograph the betting area 11 of the game table 1 from diagonally above. The camera 4 shoots continuously and generates time-series image data. The image data generated by the camera 4 is transmitted to the management control device 5.

The management control device 5 is a computer, and the processor operates according to a computer program to perform various information processing described below. In other words, in this embodiment, the features of the operation and processing of the management control device 5 in the following description are the features of the computer program. Each function of the management control device 5 described below may be realized by an independent computer program, or may be realized as each program module in a single computer program.

The management control device 5 obtains from the table chip reader 13 the information on the RFID tags 71 and 81 read by the table chip reader 13, obtains from the card shoe 2 the information on at least the rank of the cards 6 pulled out of the card shoe 2 in order, obtains from the chip tray reader 33 the information on the RFID tags 71 and 81 information from the chip tray 3, and obtains from the camera 4 the image data generated by the camera 4. The management control device 5 determines the amount of the bet in each betting area 11 based on the information of the RFID tags 71 and 81 from the table chip reader 13, and determines the game result based on the information of the rank of the cards 6 obtained in order. The game result may be judged in the card shoe 2 and obtained in the management control device 5.

The management control device 5 determines the betting status, i.e., how many chips have been bet in each betting area 11 of each playing position, based on the information obtained from the table chip reader 13. In addition, by performing image recognition on the image data obtained from the camera 4, the control device 5 recognizes the round chips 7 and plaque chips 8 in the image data, and recognizes the betting area 11 in which those chips are placed. In other words, by performing image recognition on the image data, the management control device 5 determines the betting status, i.e., how many chips are bet in which betting area 11 at which player position.

The management control device 5 can recognize each chip even when round chips 7 and plaque chips 8 are placed on top of each other. Specifically, the management control device 5 detects the stack of round chips 7 and the stack of plaque chips 8 respectively, detects the center line of the side from the image of each stack, and determines the denominations of the chips concerned by the color of the center line.

By comparing the betting status determined by the table chip reader 13 and the RFID tags 71 and 81 with the betting status determined by image recognition of the image data of the camera 4, the management control device 5 determines whether an illegal chip that does not incorporate the RFID tags 71 and 81 is bet.

The management control device 5 identifies the attributes of each chip housed in the chip tray 3 based on the information of the RFID tags 71 and 81 obtained from the chip tray reader 33, and calculates the total amount of each attribute of all chips housed in the chip tray 3, the total amount of round chips 7, the total amount of plaque chips 8, and the total amount of all chips housed in the chip tray 3.

Based on the game result and the betting status, the management control device 5 determines the player position from which the betting chips should be collected, the amount of the collection, and the player position to which the redemption should be made, the amount of the redemption, according to the rules of the baccarat game. Bets that lose the game will have their bet amount collected, and bets that win the game will be redeemed in an amount based on the bet amount according to the predetermined dividend rules (redemption rate).

The management control device 5 obtains the total amount of chips actually contained in the chip tray 3 (the actual total amount before settlement) based on information from the chip tray 3 before the settlement (i.e., collection and redemption) of the chips described above. The management control device 5 calculates the total amount of chips (calculated total amount) that should be in the chip tray 3 after collection and redemption by increasing the determined collection amount and decreasing the determined redemption amount to the actual total amount before settlement. The management control device 5 obtains the total amount of chips actually contained in the chip tray 3 (actual total amount after settlement) based on the information from the chip tray 3 after the collection and redemption have taken place. The management control device 5 compares the calculated total amount with the actual total amount after settlement and determines whether or not they match, thereby verifying whether the settlement was performed correctly. In other words, the control device 5 determines whether the actual total amount after settlement is the same as the calculated total amount, which is calculated based on the betting status, game results, and initial total amount.

If the calculated total amount and the actual total amount after settlement do not match, it means that the chips have not been collected and redeemed as calculated, and the management control device 5 outputs an error signal and records information specifying the game in which the discrepancy occurred (e.g., identification information of the game table 1, date and time of the game, difference of the discrepancy, etc.). At this time, the image data obtained from the camera 4 is also recorded along with the information identifying the game. The error signal is output to at least the card shoe 2. The card shoe 2, which receives the error signal, displays the error details on the monitor 21 and lights the corresponding lamp.

In other words, the management control device 5 adds to the total amount of chips in the chip tray 3 before settlement of each game the amount of the plaque chips 8 and the round chips 7 to be collected, and subtracts from the total amount of chips in the chip tray 3 before settlement of each game the amount of the plaque chips 8 and the round chips 7 to be redeemed, to calculate the total amount of chips that should be in the chip tray 3 after settlement (calculated total amount), compares it with the actual total amount of chips in the chip tray 3 after settlement (actual total amount after settlement), and determines whether there is any difference between the calculated total amount and the actual total amount after settlement.

In the normal operation of a baccarat game, the betting chips of losing players are first collected, and then redeemed to winning players. The management control device 5 calculates the calculated total amount after collection by increasing the collection amount against the actual total amount before settlement at the end of collection. Then, the total amount of chips actually contained in the chip tray 3 at the end of the collection (actual total amount after collection) is obtained. The management control device 5 compares the calculated total amount after collection with the actual total amount after collection and determines whether they match or not, thereby verifying whether the collection was performed correctly.

Then, the management control device 5 calculates the calculated total amount after redemption by reducing the redemption amount from the actual total amount after collection. Then, the total amount of chips actually contained in the chip tray 3 at the end of the redemption (actual total amount after redemption) is obtained. The management control device 5 compares the calculated total amount after redemption with the actual total amount after redemption, and determines whether they match or not, thereby verifying whether the redemption was carried out correctly. In this way, the management control device 5 verifies for each of collection and redemption whether they have been performed correctly.

The management control device 5 compares the calculated total amount of chip trays 3 after settlement with the actual total amount, the calculated total amount of chip trays 3 after collection with the actual total amount, and the calculated total amount of chip trays 3 after redemption with the actual total amount, respectively, for each chip attribute, for round chips 7 only, and for plaque chips 8 only, and also without distinguishing between round chips 7 and plaque chips 8.

For example, the management control device 5 calculates the plaque collection amount based on the betting status of the plaque chips 8 and the game results, and adds the calculated plaque chip collection amount to the actual total amount of plaque chips 8 in the chip tray 3 before collection to calculate the calculated total amount of plaque chips 8 in the chip tray 3 after collection. Then, the management control device 5 verifies whether the plaque chips 8 have been collected correctly by comparing the calculated total amount of plaque chips 8 after collection with the actual total amount of plaque chips 8 in the chip tray 3 after collection.

In other words, when collecting the losing chips wagered by each player in each game is completed, the management control device 5 verifies that the plaque chips 8 that were wagered in the game and that are to be collected have been collected based on the game result determined by the card shoe 2, the reading result of the table chip reader 13, and the reading result of the chip tray reader 33.

As described above, NN chips are chips that have attributes that cannot be exchanged for cash. Therefore, cash chips are paid out as reimbursement to players who win the game, but NN chips are never paid out. Therefore, from the completion of collection until the end of redemption, i.e., before and after redemption, NN chips will not increase or decrease, but cash chips will decrease.

Therefore, the management control device 5 determines whether or not there is an increase or decrease in NN chips from the chip tray 3 before and after the redemption, and whether or not the cash chip is decreasing. If the NN chip is increasing or decreasing before or after the redemption, the management control device 5 outputs an error signal. If the cash chip has not decreased before or after the redemption, the management control device 5 outputs an error signal.

Further, for example, the management control device 5 calculates the cash chip recovery amount based on the cash chip betting status and the game results, and adds the calculated cash chip recovery amount to the actual total amount of cash chips in the chip tray 3 before the redemption. The management control device 5 then calculates the total amount of cash chips in the chip tray 3 after collection by adding the calculated cash chip collection amount to the actual total amount of cash chips in the chip tray 3 before collection. The management control device 5 then compares the calculated total amount of cash chips after the collection with the actual total amount of cash chips in the chip tray 3 after the collection to verify whether the collection of the cash chips was performed correctly.

In other words, when the collecting the losing chips wagered by each player in each game is completed, the management control device 5 verifies that the cash chips that were wagered in the game and that are to be collected are placed in the chip tray 3 based on the game results determined by the card shoe 2, the reading results of the table chip reader 13, and the reading results of the chip tray reader 33.

For example, the management control device 5 calculates the cash chip redemption amount based on the cash chip betting status and the game results, and subtracts the calculated cash chip redemption amount from the actual total amount of cash chips in the chip tray 3 before redemption after collection to calculate the calculated total amount of cash chips in the chip tray after redemption. The management and control device 5 then verifies whether the redemption of the cash chip has been carried out correctly by comparing the calculated total amount of the cash chip after redemption with the actual total amount of the cash chip in the chip tray after redemption.

In other words, when the redemption to the winning chips wagered by each player in each game has been completed, the management control device 5 verifies that the cash chips stored in the chip tray 3 have been redeemed to the winning chips based on the win/loss result determined by the card shoe 2, the reading result of the table chip reader 13, and the reading result of the chip tray reader 33.

The management and control device 5 has a database that stores the identification information of valid chips or is connected to such a database. An authenticity of the chip may be determined by determining whether the identification information of the chip stored in the RFID tags 71 and 81 read from the table chip reader 13 and the chip tray reader 33, respectively, is stored in the database as the identification information of a valid chip.

Figure 5:
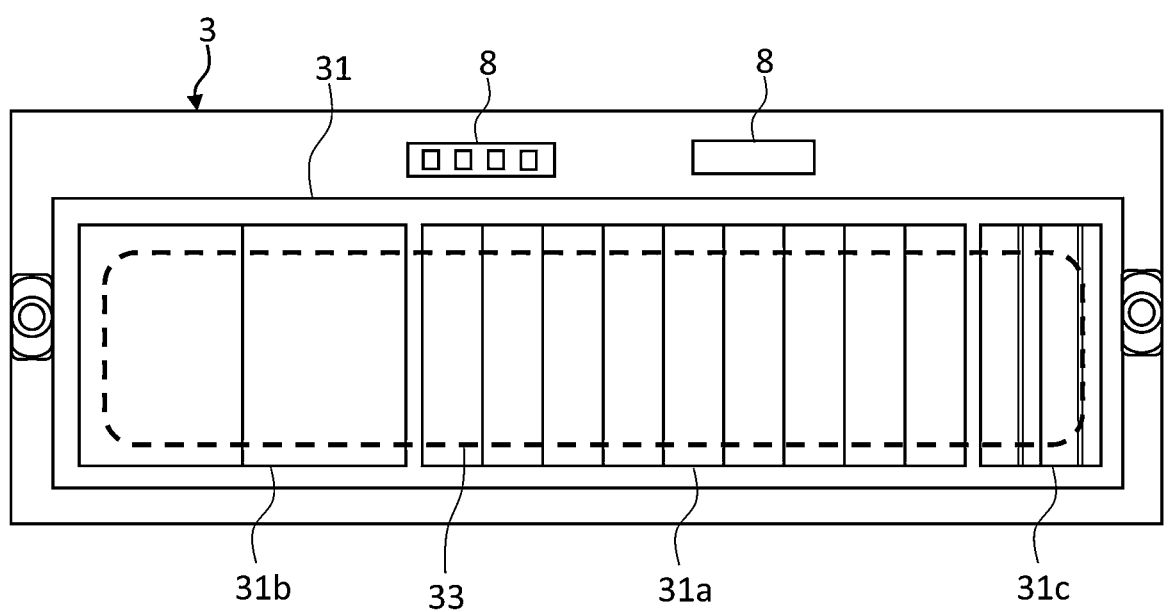
FIG. 5 shows a plan view of the chip tray of an embodiment of the present disclosure.
Figure 6:
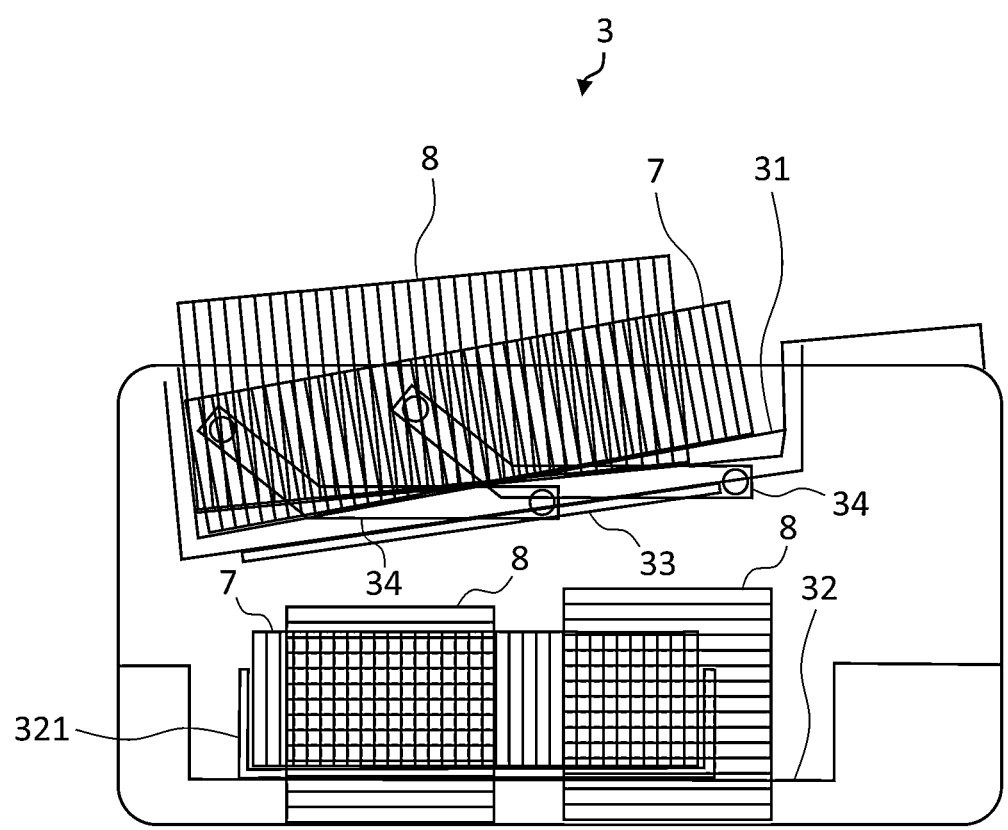
FIG. 6 shows a cross-sectional view of the chip tray of an embodiment of the present disclosure.
Figure 7:
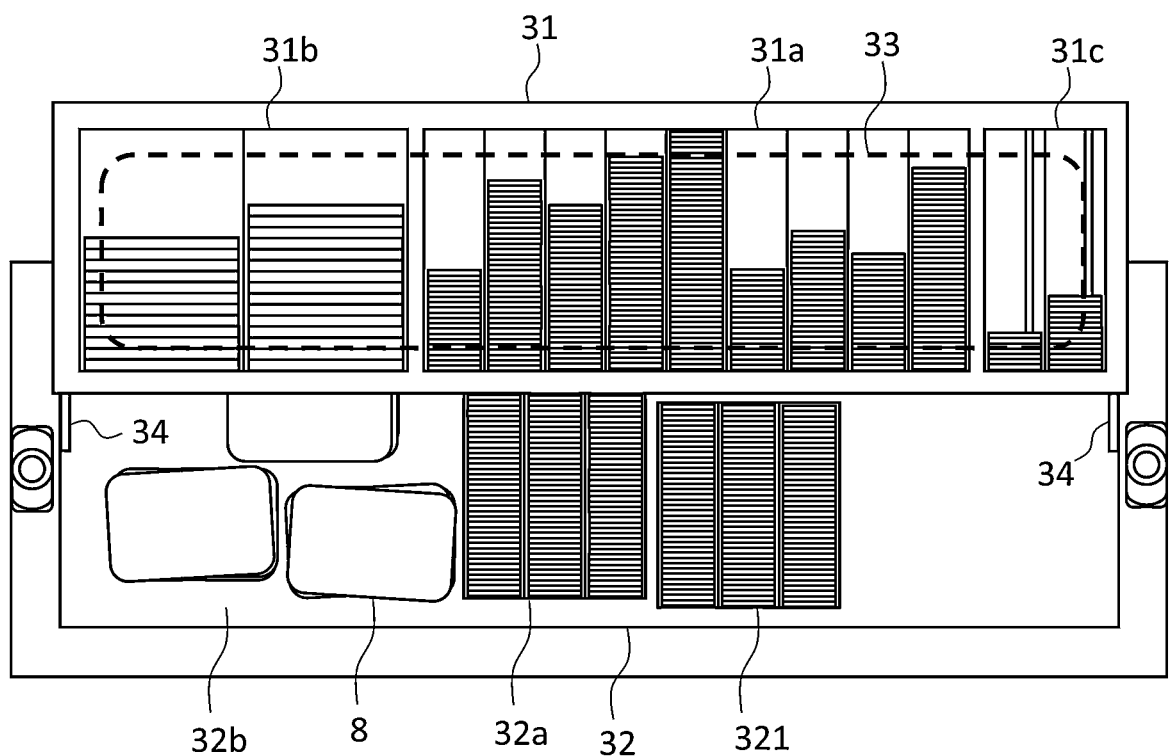
FIG. 7 shows a plan view of a chip tray with the upper chip holder open of an embodiment of the present disclosure.

FIG. 5 shows a plan view of the chip tray of an embodiment of the present disclosure, FIG. 6 shows a cross-sectional view of the chip tray of an embodiment of the present disclosure, and FIG. 7 shows a plan view of a chip tray with the upper chip holder open of an embodiment of the present disclosure. As described above, the chip tray 3 is a double chip tray with an upper chip holder 31 and a lower chip holder 32.

The upper chip holder 31 has a round chip holder 31*a* for holding round chips 7 in rows of different denominations, a plaque chip holder 31*b* for holding plaque chips 8, and a collected chip holder 31*c* for temporarily holding collected round chips 7.

The round chip holder 31*a* of the upper chip holder 31 has a half-tube-shaped tube that follows the shape of the round chip 7. The round chips 7 are stacked along the tube in a vertical position and held in the round chip holder 31*a*. The plaque chip holder 31*b* has a tray-shaped groove that follows the shape of the plaque chip 8. The plaque chips are stacked in a vertical position along the grooves and held in the plaque chip holder 31*b*.

The collected chip holder 31*c* has a half-tube-shaped tube that follows the shape of the round chip 7. The collected round chips 7 are stacked and accommodated in a vertical position along the tube. The tube of the collected chip holder 31*c* has a slit extending in the longitudinal direction, i.e., the direction in which the collected round chips 7 are stacked. A camera is provided on the back side of the slit. The camera photographs, through the slit, a part of the side of the round chip 7 held in the collected chip holder 31*c*. Based on the image of the camera, the management control device 5 determines the amount of the round chip 7 held by the collected chip holder 31*c*.

The round chip holder 32*a* of the lower chip holder 32 has a half-tube-shaped tube that follows the shape of the round chip 7. The round chips 7 are stacked along the tube in a vertical position and held in the round chip holder 32*a*. In this embodiment, the round chip 7 is housed in a case 321 in which three tubes are integrated, and the case 321 is held in the round chip holder 32*a*. The plaque chip holder 31*b* has a width greater than or equal to the width of the plaque chip 8. The plaque chips 8 are stacked and held by the plaque chip holder 31*b* in a flat position.

The chip tray reader 33 is an RFID chip reader that is provided as an RFID antenna on the back surface of the upper chip holder 31. The RFID antenna is formed on the back surface of the upper chip holder 31 so as to spread out in a planar direction. The shape of the RFID antenna and the electromagnetic waves generated by the antenna are designed, as described above, so as to be able to read the RFID tags 71 and 81 of all round chips 7 and plaque chips 8 that are stacked vertically in the upper chip holder 31, and be able to read the RFID tags 71 of all round chips 7 that are stacked vertically in the lower chip compartment 32 and the RFID tags of all plaque chips 8 that are stacked flat in the lower chip compartment 32.

In other words, the chip tray reader 33 is designed to be able to read the RFID tags 71 and 81 embedded in the round chips 7 and plaque chips 8 in both cases where the round chips 7 and plaque chips 8 are placed vertically and flatly in the chip tray 3.

The plaque chip holder 31*b* of the upper chip holder 31 can also hold plaque chips 8 stacked in a flat state, and the chip tray reader 33 can also read the RFID tags 81 of plaque chips 8 stacked in a flat state in the upper chip holder 31.

In the lower chip holder 32, round chips 7 and plaque chips 8 can be held in any state, vertically and flat, without a tube for holding round chips 7 or a groove for holding plaque chips 8. The chip tray reader 33 is configured to be able to read the RFID tags 71 and 81 of the round chips 7 and plaque chips 8 so housed in the lower chip holder 32 in any orientation of vertical and flat.

Though in this embodiment, as a chip tray reader 33, one RFID antenna is installed on the back side of the upper chip holder 31, and this RFID antenna can be used to read the RFID tags 71 and 81 of round chips 7 and plaque chips 8 housed in the upper chip holder 31 and lower chip holder 32 in the respective orientations of vertical and flat, alternatively, a plurality of RFID readers 33 may be installed as chip tray readers 33.

Figure 8:
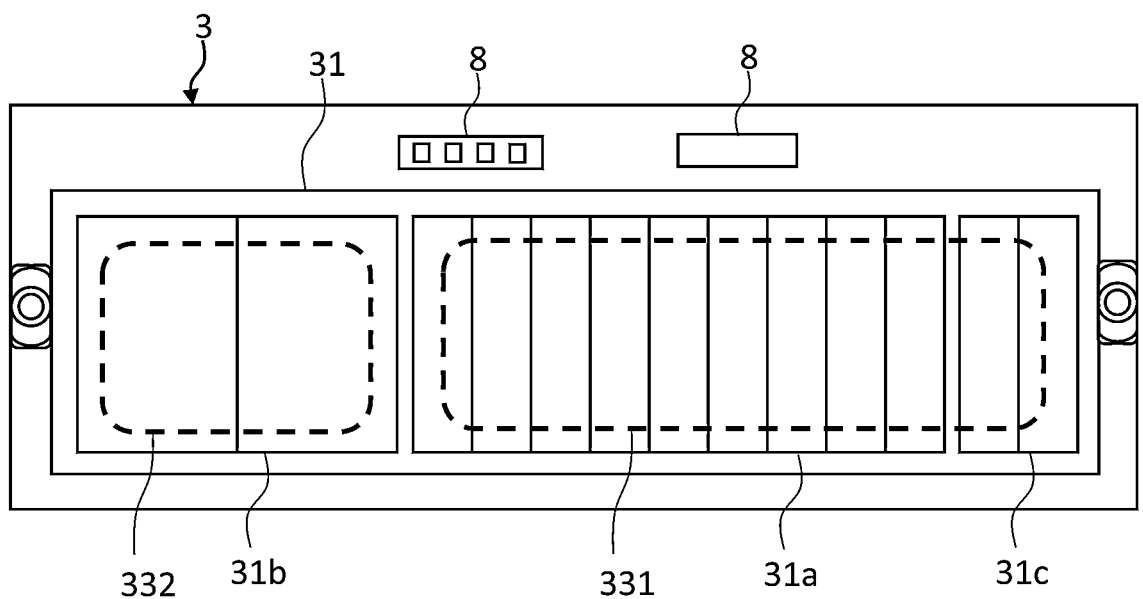
FIG. 8 shows a plan view of another example of a chip tray of an embodiment of the present disclosure.

FIG. 8 shows a plan view of another example of a chip tray of an embodiment of the present disclosure. FIG. 8 shows an example in which an RFID antenna 331 for reading the RFID tags 71 of the round chips 7 and an RFID antenna 332 for reading the RFID tags 81 of the plaque chips 8 are installed as separate antennas in the upper chip holder 31.

Figure 9:
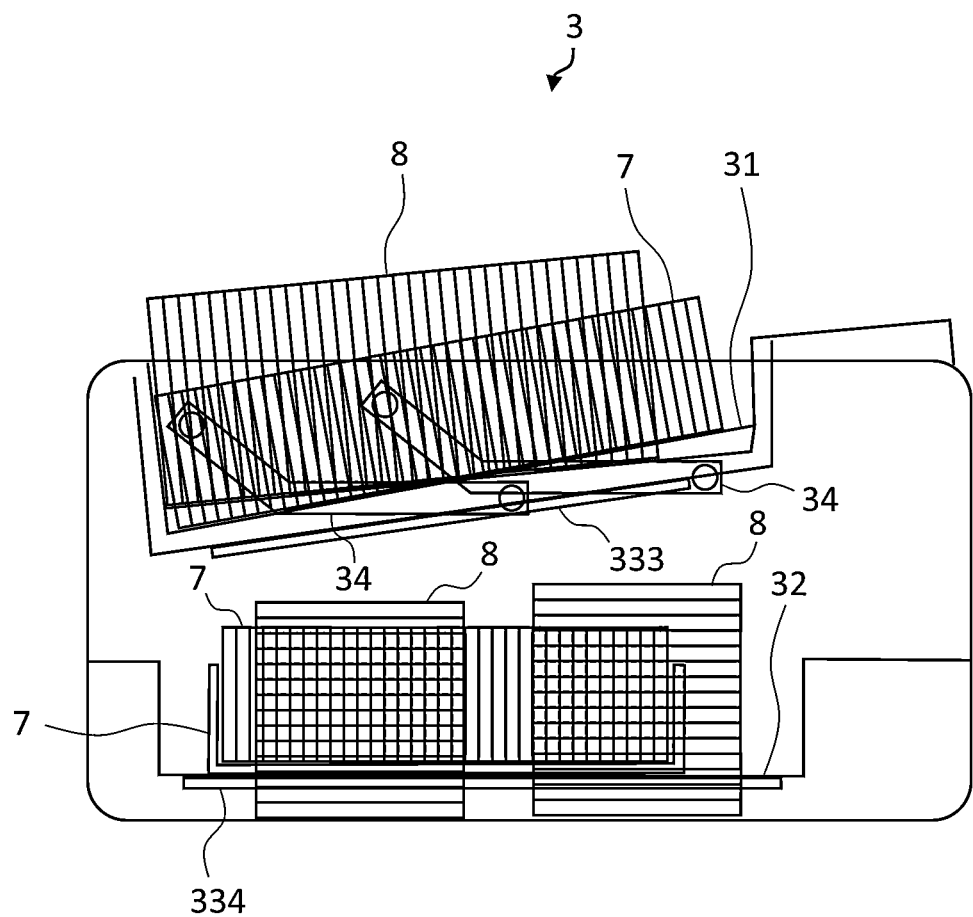
FIG. 9 shows a cross-sectional view of another example of a chip tray of an embodiment of the present disclosure.

FIG. 9 shows a cross-sectional view of another example of a chip tray of an embodiment of the present disclosure. FIG. 9 shows an example in which an RFID antenna 333 for reading the RFID tags 71 and 81 of the round chips 7 and plaque chips 8 in the upper chip holder 31 and an RFID antennas 334 for reading the RFID tags 71 and 81 of the round chips 7 and plaque chips 8 in the lower chip holder 32 are provided as separate antennas.

Figure 10:
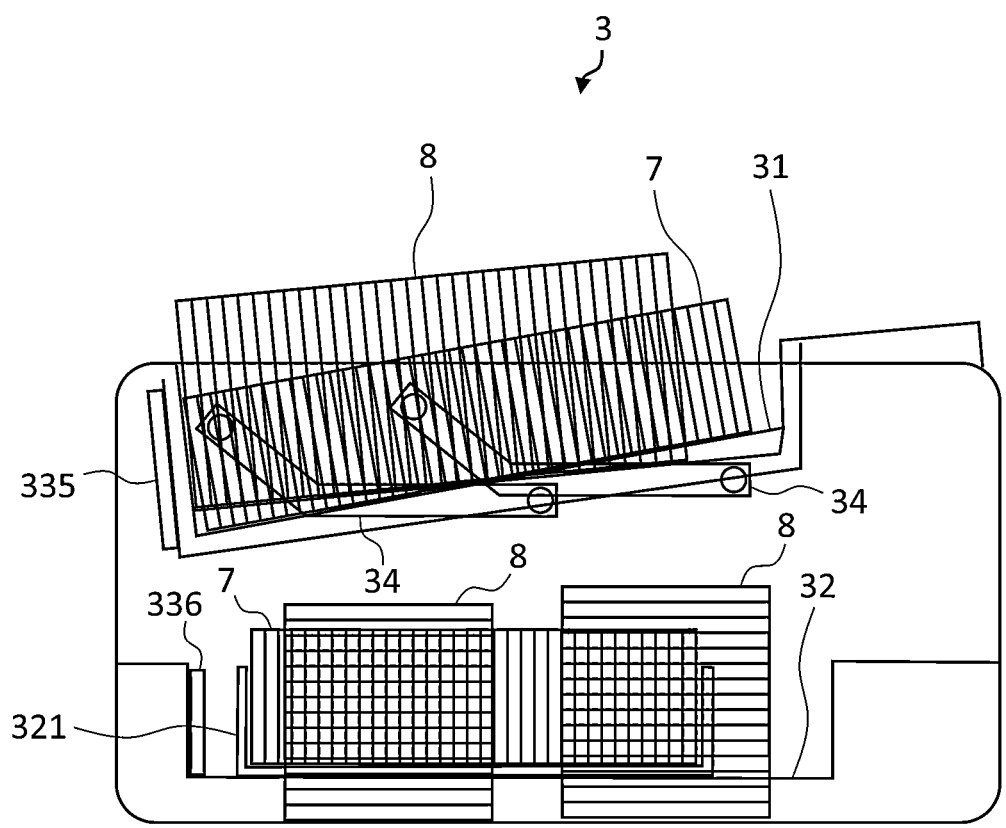
FIG. 10 shows a cross-sectional view of another example of a chip tray of an embodiment of the present disclosure.

FIG. 10 shows a cross-sectional view of another example of a chip tray of an embodiment of the present disclosure.

FIG. 10 also shows an example in which an RFID antenna 335 for reading the RFID tags 71 and 81 of the round chips 7 and plaque chips 8 in the upper chip holder 31 and an RFID antenna 336 for reading the RFID tags 71 and 81 of the round chips 7 and plaque chips 8 in the lower chip holder 32 are provided as separate antennas, and where each RFID antenna 335 and 336 is arranged in the stacking direction of the chips placed vertically.

An RFID antenna for reading the RFID tags 71 and 81 of the round chips 7 and the plaque chips 8 that are held in the upper chip holder 31 in a vertical position, and an RFID antenna for reading the RFID tags 71 and 81 of the round chips 7 and the plaque chips 8 that are held in the upper chip holder 31 in a flat position, an RFID antenna for reading the RFID tags 71 and 81 of the round chips 7 and the plaque chips 8 held in the lower chip holder 32 in a vertical position, and an RFID antenna for reading the RFID tags 71 and 81 of the round chips 7 and the plaque chips 8 held in the lower chip holder 32 in a flat position may be provided as separate antennas.

Furthermore, an RFID antenna for reading the RFID tags of the chips held in a flat state and an RFID antenna for reading the RFID tags of the chips held in a vertical state may be provided as separate antennas.

When a plurality of RFID antennas are used as the chip tray reader 33, the management control device 5, which receives reading results from each of the plurality of RFID antennas, may integrate the information on the chips read in duplicate by the plurality of antennas using the identification information on the chips read by each antenna to calculate a total amount of chips contained in the chip tray 3.

When multiple RFID tags 71 or 81 are built into a round chip 7 or plaque chip 8, the same identification information is stored in each RFID tag 71 and 81 in the same chip. The chip tray reader 33 will read any of the multiple RFID tags 71, 81 embedded in one chip. The management control device 5 integrates the information of the plurality of RFID tags 71 and 81 having the same identification information, recognizes them as the information of the RFID tags built into one chip, and calculates the total amount of chips contained in the chip tray 3.

As described above, the RFID tags 71 and 81 store information on the denomination of the chip as well as information on the attributes of the chip (cash chip, NN chip). The chip tray reader 33 also transmits this attribute information read from the RFID tags 71 and 81 to the management control device 5 in association with the denomination information. Based on the results of reading the RFID tags 71 and 81, the management control device 5 calculates the total amount for each attribute of the chips contained in the chip tray 33, and also calculates the total amount for all chips without distinguishing between the attributes.

As shown in FIG. 7, a connecting mechanism is provided between the upper chip holder 31 and the lower chip holder 32 to connect them. With this connecting mechanism 34, the upper chip holder 31 can be moved between a closed position in which the upper chip holder 31 covers the lower chip holder 32 from above and an open position (state of FIG. 7) in which the upper chip holder 31 is displaced from the lower chip holder 32 to open the upper surface of the lower chip holder 32.

The open position is above the closed position and in the forward direction (away from the dealer and closer to the player position). This allows the dealer to easily access the lower chip holder 32. The connecting mechanism 34 employs a parallel ruler structure. This allows the upper chip holder 31 to move diagonally upward in an arc from the closed position to the open position while remaining horizontal orientation, and also to move diagonally downward in an arc from the open position to the closed position while remaining horizontal orientation, and these movements do not disturb the chips stored in the upper chip holder 31.

The dealer uses the upper chip holder 31 in the closed position when the game is played, i.e., in normal operation. When there are not enough chips in the upper chip holder 31, the dealer moves the upper chip holder 31 from the closed position to the open position to open the lower chip holder 32, takes out the necessary chips from the lower chip holder 32, and replenishes the upper chip holder 31. The dealer also moves the upper chip holder 31 from the closed position to the open position and moves a part of chips in the upper chip holder 31 to the lower chip holder 32 when the upper chip holder 31 becomes overloaded with chips.

The chip tray 33 detects that the upper chip holder 31 has been moved from the closed position to the open position (opening movement) and that the upper chip holder 31 has been moved from the open position to the closed position (closing movement) using a sensor not shown in the figure. When the sensor detects the opening movement of the upper chip holder 31, the chip tray 33 transmits a signal notifying the opening movement (opening movement detection signal) to the management control device 5, and when the sensor detects the closing movement of the upper chip holder 31, the chip tray 33 transmits a signal notifying the closing movement (closing movement detection signal) to the management control device 5. When the chip tray 33 detects both opening and closing movement, the chip tray 33 may transmit a signal (opening/closing movement detection signal) to the management control device 5 to notify that there has been an opening/closing movement.

When the management control device 5 receives the opening movement detection signal and the closing movement detection signal, it determines accordingly whether the total amount of all chips contained in the chip tray 3 has increased or decreased. The management control device 5 compares the total amount of chips detected by the chip tray reader 33 immediately before receiving the opening movement detection signal (total amount before opening) with the total amount of chips detected by the chip tray reader 33 immediately after receiving the closing movement detection signal (total amount after closing).

If the chips are only moved between the upper chip holder 31 and the lower chip holder 32, there is no difference between the total amount before opening and the total amount after closing. If the total amount before opening and the total amount after closing do not match, chips may have been added from a pit, chips may have been moved to the pit, or chips may have been added to or removed from the chip tray 3 by some fraud.

If the total amount before opening and the total amount after closing do not match, the management control device 5 records this fact along with the positive or negative difference, and outputs an error signal indicating the mismatch and the difference to the outside, if necessary. By checking this error signal against the record of the exchange of chips between the pit and the game table 1, the management control device 5, or any other device that receives this report, determines whether the discrepancy is due to the exchange between the pit and the game table 1, or whether there has been some fraud. The error signal is output to at least the card shoe 2. Upon receiving the error signal, the card shoe 2 displays the contents of the error on the monitor 21 and lights the corresponding lamp.

When the chip tray reader 33 uses a plurality of RFID antennas to read the chips stored in the upper chip holder 31 and the chips stored in the lower chip holder 32, the management control device 5 can determine whether the increase or decrease in the upper chip holder 31 matches the decrease or increase in the lower chip holder 32. In this way, the system is able to determine whether or not the increase or decrease in the upper chip holder 31 corresponds to the decrease or increase in the lower chip holder 32.

The total amount of chips stored in the chip tray 3 increases or decreases depending on the settlement (collection and redemption) in the game. Therefore, the management control device 5 compares the calculated total amount with the actual total amount after the settlement of each game, as described above. A player can request the dealer to exchange chips between games. As mentioned above, NN chips are not originally exchangeable for cash, and cannot be exchanged for cash chips. However, some casinos allow players to exchange their NN chips for cash chips held by the dealer at a predetermined exchange ratio lower than the equivalent.

Therefore, the management control device 5 determines whether the exchange of the NN chip for the cash chip has been done correctly according to the set exchange ratio. For example, if the exchange ratio of NN chips to cash chips is set to 0.8, and the dealer gives the player a cash chip of 80 in value for the NN chip of 100 in value provided by the player, the management control device 5 compares the readings of the chip tray 3 before and after the exchange to determine whether a cash chip of amount 0.8 times the amount of NN chips added to the tray 3 is missing from the chip tray 3.

In addition, if players are allowed to exchange cash chips for NN chips, the management control device 5 determines whether such exchange has been done correctly according to the set exchange ratio. For example, if the cash chip to NN chip exchange ratio is set to 1.1, and the dealer gives the player an NN chip in the amount of 110 for a cash chip in the amount of 100 provided by the player, the management control device 5 compares the chip tray 3 readings before and after the exchange to determine whether the NN chip of the amount 1.1 times of the amount of the cash chip added to the chip tray 3 is missing from the chip tray 3.

If the management control device 5 determines that the cash chip has not been exchanged for the NN chip correctly, it records this fact along with the positive or negative difference between the calculated total amount and the actual total amount, and if necessary, outputs an error signal to the outside indicating the irregularity and the difference. The error signal is output to at least the card shoe 2. The card shoe 2 receives the error signal and displays the error details on the monitor 21 and lights the corresponding lamp.

As described above, the chip tray 3 and the game management system including the chip tray 3 of this embodiment can read the RFID tags 71 and 81 embedded in the chips with the chip tray reader 33, and perform various game management based on them, even when round chips 7 and plaque chips 8 of different sizes or shapes are stored together, as well as even when chips that are placed vertically and chips that are placed flat are stored together, the chip tray reader 33 can read the RFID tags 71 and 81 embedded in the chips.

In addition, since the RFID tags 71 and 81 store information on the attributes of the chips, the management control device 5 can determine the attributes (cash chips and NN chips) of the chips contained in the chip tray 3, and can perform game management for round chips 7 and plaque chips 8, respectively. The game can be managed based on the attributes of the round chips 7 and plaque chips 8.

In the above embodiment, the chip tray 3 was a double chip tray with an upper chip holder 31 and a lower chip holder 32, but the chip tray 3 is not limited to this, and may be a single chip tray that can accommodate round chips 7 and plaque chips 8.

This single chip tray is equipped with a tray chip reader that can read chips of two different shapes or sizes (round chips 7 and plaque chips 8) that incorporate RFID tags. The tray chip reader reads the RFID tags 71 and 81 of the round chips 7 and plaque chips 8 contained in the chip tray, and the management control device 5 determines the attributes and amounts of each.

This single chip tray can contain round chips 7 in a vertical position, which are stored along a tube provided in the chip tray 3, and plaque chips 8 in a vertical or flat position. Even with such a single chip tray, the chip tray reader can read the RFID tags 71 and 81 of the round chips 7 and the plaque chips 8 in the vertical and flat positions.

Figure 11:
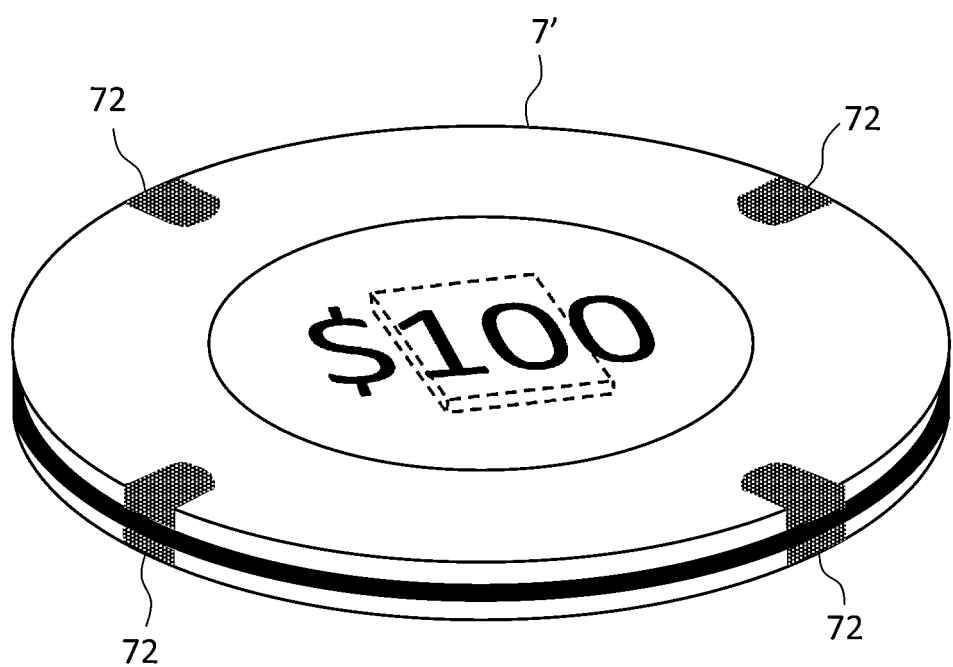
FIG. 11 shows a variation of the chip of an embodiment of the present disclosure.

FIG. 11 shows a variation of the chip of an embodiment of the present disclosure. In this variation, an insert member 72 is provided at predetermined intervals around the periphery of the round chip 7'. The insert members 72 can be observed at the sides, and also at the front and back surfaces. The color, shape, and/or number of the insert members 72 represent the attributes of the chip in question (whether it is a NN chip or a cash chip). Therefore, according to this variation of the round chip 7', the attributes of the chip in question can be determined from the sides, as well as from the front and back surfaces. The center line of the side of the round chip 7' continuously circles the side of the round chip 7 without being blocked by the insert member 72. The insert member 72 is provided in at least three locations (at equal angular intervals of no more than 120 degrees) so that at least one of the insert members 72 can be observed from the side even when the round chip 7' is at any rotation angle in the circumferential direction.

A similar insert member may also be provided for the plaque chip 8. In the case of the plaque chip 8, at least one insert member may be provided on each of the four sides. Alternatively, insert members may be provided on only two long sides or only two short sides.

DESCRIPTION OF REFERENCES

1 Game table
2 Card shoe
3 Chip tray
4 Camera
5 Management control unit
6 Playing card
7 Round chip
8 Plaque chip
11 Betting area
12 Card placement area
13 Table chip reader
31 Upper chip holder
31a Round chip holder
31b Plaque chip holder
31c Collected chip holder
32 Lower chip holder
32a Round chip holder
32b Plaque chip holder
33 Chip tray reader
61 Code
71 RFID tag
81 RFID tag

The invention claimed is:

1. A double chip tray comprising:
an RFID chip reader configured to read two types of chips of different shapes and/or sizes that incorporate RFID tags;
a lower chip holder configured to hold the chips; and
an upper chip holder configured to hold the chips,
wherein:
the two types of chips are disc-shaped chips and rectangular plate-shaped chips, and each of the two types of chips incorporates at least one or two RFID tags associated with a denomination of the chip,
the lower chip holder is configured to hold at least the disc-shaped chip,
the upper chip holder is configured to hold at least the rectangular plate-shaped chip,
the RFID chip reader is configured to read the RFID tags of the two types of chips, the disc-shaped chip and the rectangular plate-shaped chip, held in the double chip tray, and to determine a respective amount,
the rectangular plate-shaped chip can be held in the double chip tray in a flat position against a lower wall of the lower or upper chip holder, and
the RFID chip reader is configured to read the RFID tag of the rectangular plate-shaped chip placed in the flat position.

2. The double chip tray according to claim 1, wherein:
the disc-shaped chip can be held in a vertical position against the lower wall along a tube provided in the double chip tray,
the rectangular plate-shaped chip can be held in the double chip tray in a vertical position against the lower wall, and
the RFID chip reader is configured to read the RFID tags of the disc-shaped chip placed in the vertical position and the rectangular plate-shaped chip placed in the vertical position.

3. The double chip tray according to claim 2, wherein the RFID chip reader is configured to read the RFID tags embedded in the disc-shaped chips or rectangular plate-shaped chips, whether the disc-shaped chips or rectangular plate-shaped chips are placed in the vertical position or the flat position in the double chip tray.

4. The double chip tray according to claim 3, wherein:
the lower chip holder is configured to hold the disc-shaped chips or the rectangular plate-shaped chips in the vertical position along the tube, and
the RFID chip reader is configured to read the RFID tags of the disc-shaped chips or the rectangular plate-shaped chips placed in the vertical position in the lower chip holder.

5. The double chip tray according to claim 3, wherein:
the upper chip holder is configured to hold the disc-shaped chips or rectangular plate-shaped chips in the vertical and flat positions, and
the RFID chip reader is configured to read the RFID tags of the disc-shaped chips or the rectangular plate-shaped chips placed in the vertical and flat positions in the upper chip holder.

6. The double chip tray according to claim 5, wherein the RFID chip reader is further configured to read the RFID tags of the disc-shaped chips or the rectangular plate-shaped chips placed in the flat position in the lower chip holder.

7. The double chip tray according to claim 1, wherein the RFID chip reader is provided with a plurality of RFID antennas, the plurality of RFID antennas being located in each of the upper chip holder and the lower chip holder.

8. The double chip tray according to claim 1, wherein when each of the disc-shaped chips or the rectangular plate-shaped chips is provided with a plurality of RFID tags, the RFID chip reader configured to recognize the plurality of RFID tags as being incorporated in the same disc-shaped chip or the same rectangular plate-shaped chip.

9. The double chip tray according to claim 1, wherein the total amount of each of the disc-shaped chips and rectangular plate-shaped chips contained in the double chip tray is determined based on the reading of the RFID tag.

10. The double chip tray according to claim 1, further comprising a connecting mechanism configured to connect the upper chip holder to the lower chip holder and move the upper chip holder between a first position that covers the lower chip holder from above and a second position that is displaced from the lower chip holder to open the upper surface of the lower chip holder.

11. The double chip tray according to claim 10, further comprising a determination device configured to determine whether or not there is a variation in a sum of the information of the RFID tags stored in the double chip tray before and after a movement of the upper chip holder by the connecting mechanism.

12. The double chip tray according to claim 11, further comprising a display device that displays a result of a determination of the determination device.

13. A game management system comprising:
a double chip tray according to claim 1;
a winning/losing result determination device configured to determine a winning/losing result of each game on a game table;
a table chip determination device configured to identify locations, attributes, and amount of chips placed on the game table; and
a management control device configured to identify the attributes and amounts of the chips in the double chip tray and the chips on the game table based on the results of the reading of an RFID chip reader of the double chip tray and the results of a determination of the table chip determination device,
wherein the management control device is configured to determine that the chips being wagered in the game and to be collected have been collected to the double chip tray, based on the winning/losing result determined by the winning/losing result determination device, a reading result of the RFID chip reader, and a determination result of the table chip determination device, when collections of losing chips wagered by each player in each game has been completed.

14. The game management system according to claim 13, wherein the management control device is configured to determine that a payout to winning chips has been performed using the chips contained in the double chip tray, based on the winning/losing result determined by the winning/losing result determination device, a reading result of the RFID chip reader, and a determination result of the table chip determination device, when payouts to the winning chips wagered by each player in each game has been completed.

15. The game management system according to claim 14, wherein:
the management control device is configured to calculate a calculated total amount of the chips that should be in the double chip tray, compare the calculated total amount with an actual total amount of chips in the double chip tray after the settlement, and determine whether there is a difference between the calculated total amount and the actual total amount, the management control device is configured to calculate the calculated total amount of the chips by adding an amount of the chips to be collected to and subtracting an amount of the chips to be paid-out from a total amount of chips in the double chip tray before the settlement of each game, and the amount of the chips to be collected and the amount of the chips to be paid-out is to be calculated based on the winning/losing result determined by the winning/losing result determination device and a determination result of the table chip determination device.

* * * * *